United States Patent [19]

Franklin

[11] Patent Number: 4,839,749
[45] Date of Patent: Jun. 13, 1989

[54] RECORDED VOICE WARNING SYSTEM FOR PROVIDING SAFETY ALERTS AND PERSONAL MESSAGES

[76] Inventor: Eustace B. Franklin, 11435 Oxford Ave., Hawthorne, Calif. 90250

[21] Appl. No.: 902,689

[22] Filed: Sep. 2, 1986

[51] Int. Cl.[4] .......................... G11B 5/00; G08B 19/00
[52] U.S. Cl. ...................................... 360/12; 369/69; 369/21; 340/457; 340/460
[58] Field of Search ........... 360/12, 61, 63, 72.1–72.3; 340/52 D, 52 F, 62, 902; 369/69, 21

[56] References Cited

U.S. PATENT DOCUMENTS

| | | | |
|---|---|---|---|
| 2,288,683 | 7/1942 | Clancy | 369/69 |
| 3,858,195 | 12/1974 | Gregg, Jr. et al. | 360/12 |
| 3,873,963 | 3/1975 | Neal et al. | 340/902 |
| 3,909,842 | 9/1975 | Noji | 360/12 |
| 3,997,869 | 12/1976 | Mayer | 340/62 |
| 4,032,981 | 6/1977 | Arguelles | 360/72.1 |
| 4,054,926 | 10/1977 | Haynes | 360/61 |
| 4,074,071 | 2/1978 | Shragal | 360/61 |
| 4,159,531 | 6/1979 | McGrath | 340/52 D |
| 4,190,819 | 2/1980 | Burgyan | 360/12 |
| 4,383,241 | 5/1983 | Kojima et al. | 340/52 F |
| 4,389,639 | 6/1983 | Torii et al. | 340/52 F |
| 4,401,971 | 8/1983 | Saito et al. | 340/52 F |
| 4,426,691 | 1/1984 | Kawasaki | 360/12 |
| 4,438,422 | 3/1984 | Nojiri et al. | 340/52 F |
| 4,550,303 | 10/1985 | Steele | 340/52 D |
| 4,612,623 | 9/1986 | Bazarnik | 340/52 D |

*Primary Examiner*—Alan Faber
*Assistant Examiner*—Surinder Sachar
*Attorney, Agent, or Firm*—Albert O. Cota

[57] ABSTRACT

A vehicle safety and personal message system primarily designed to be incorporated into a vehicle to provide the driver with a pre-recorded speech message pertaining to either a vehicle safety alert or a personal message. The safety alerts include such events as: door ajar, burglar alarm ON or OFF, speed limit exceeded and a fire/police siren detector. The personalized messages includes reminders such as birth dates, anniversaries, meeting date/time and scheduled maintenance periods. All the messages can be recorded in any language and in any local or ethnic jargon and the personal messages may be programmed to occur at anytime within a one-year period. Although the system's primary usage is for vehicles, it can also be adapted for use on many other products that utilize short messages. These products include robotics, ATM machines, telephone answering machines, fire detection devices, toys and numerous other consumer oriented products.

10 Claims, 13 Drawing Sheets

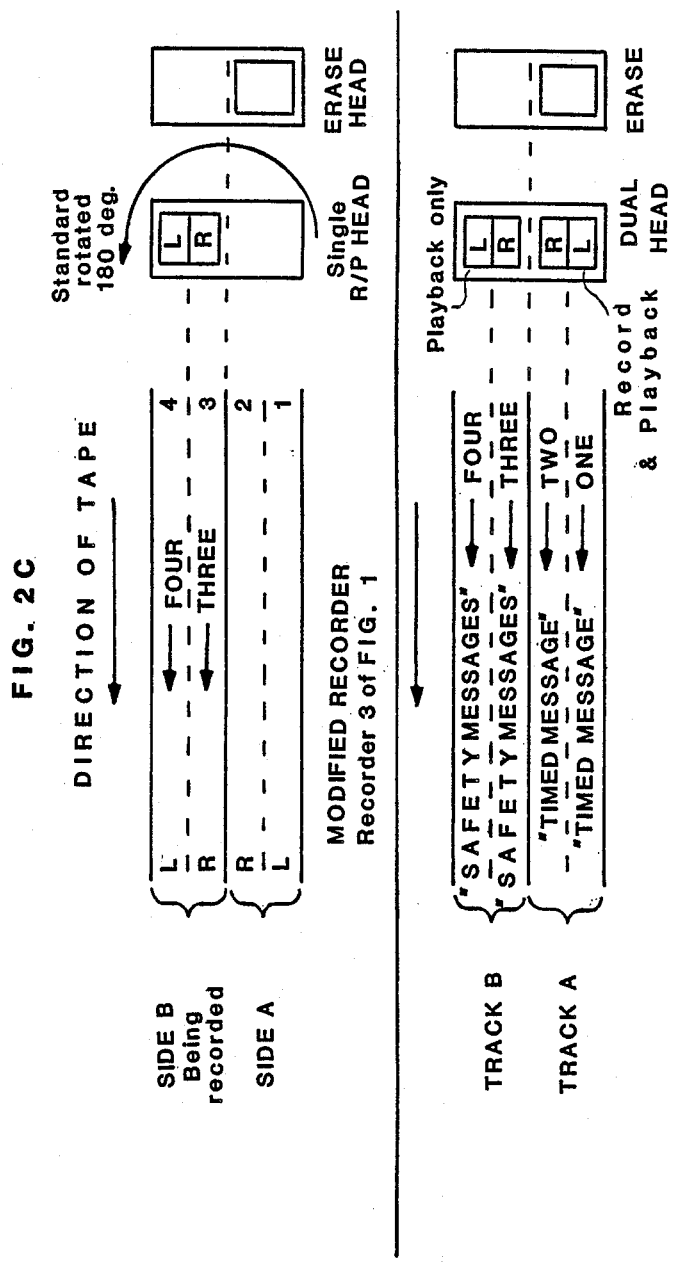

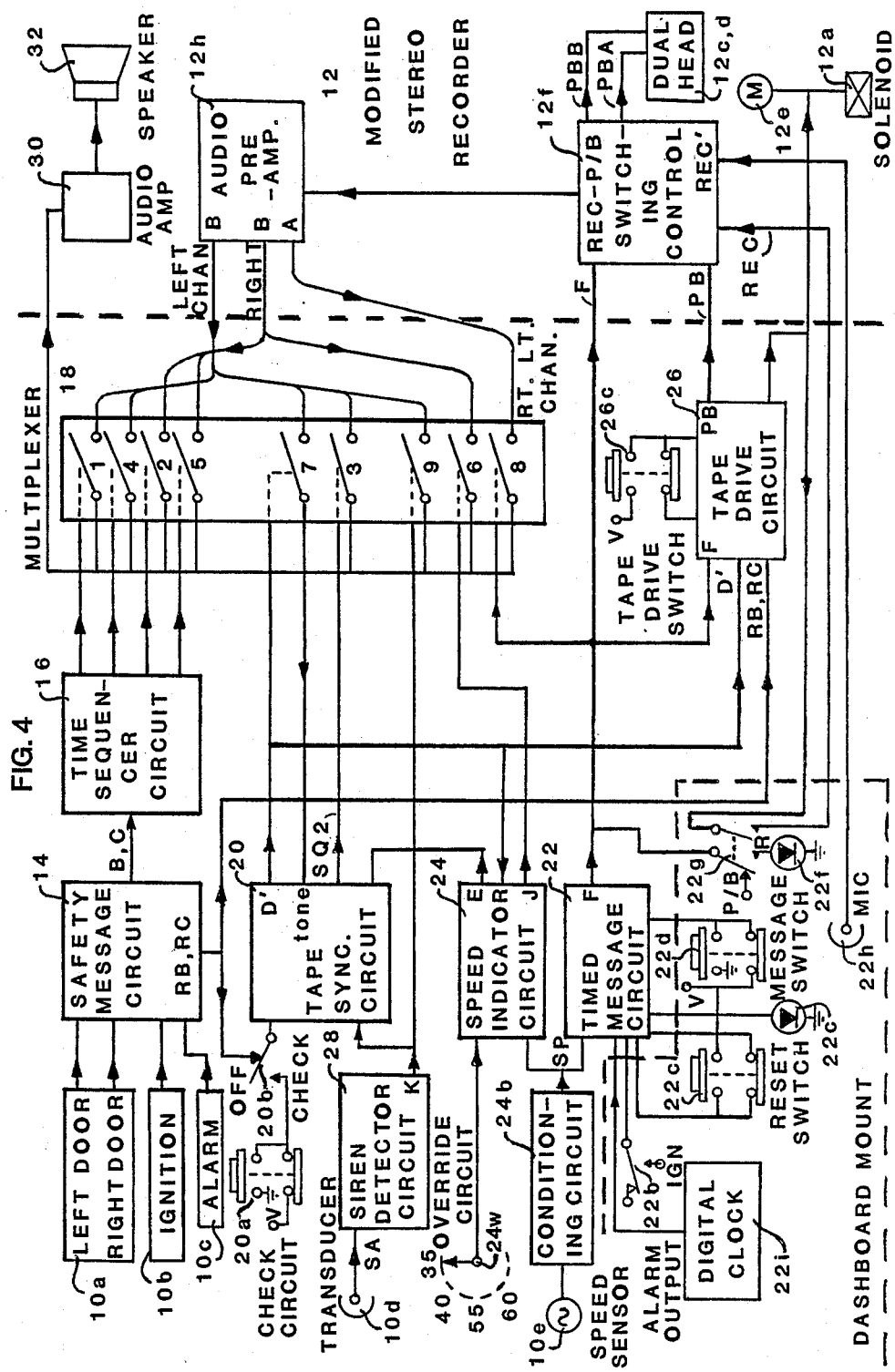

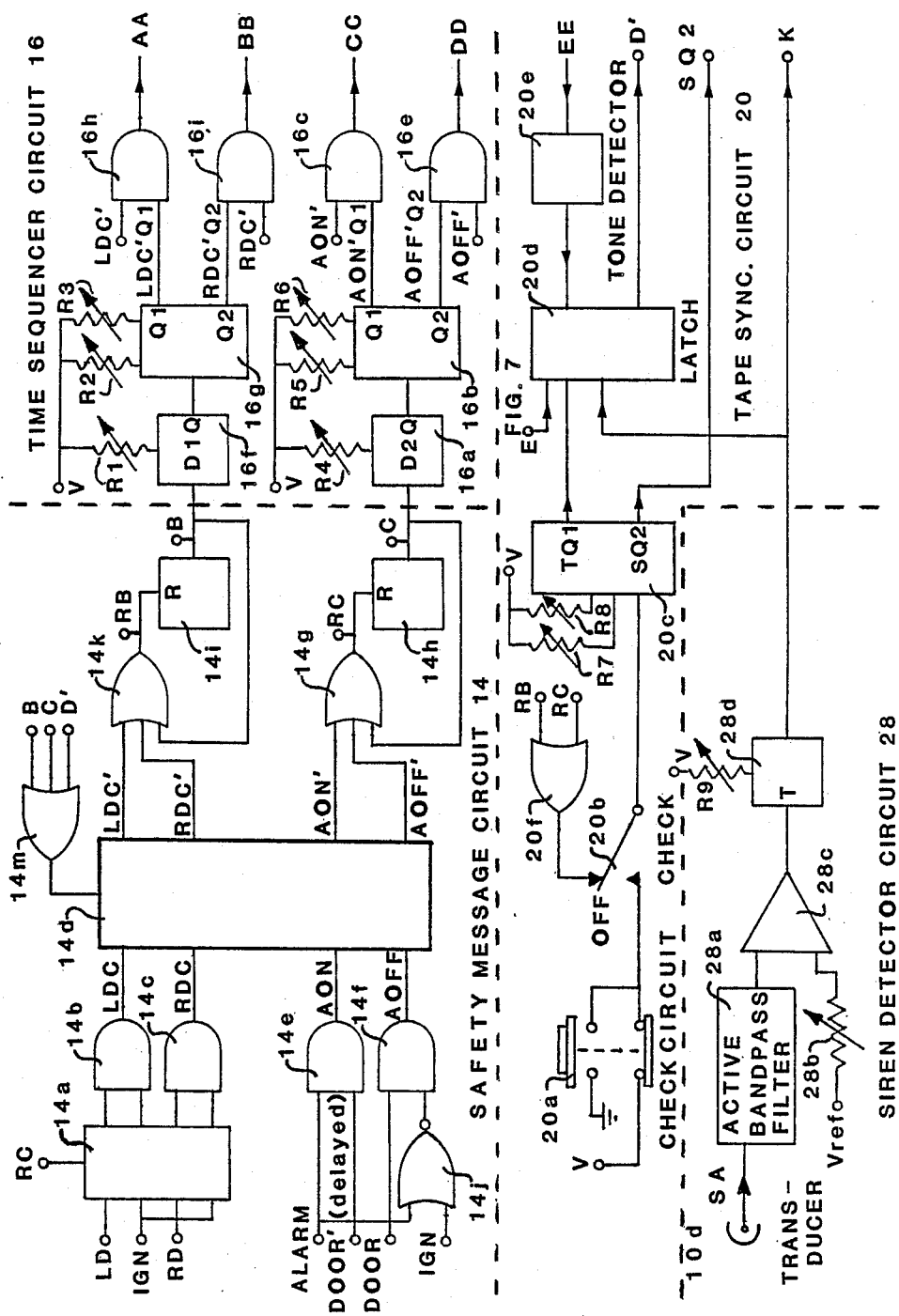

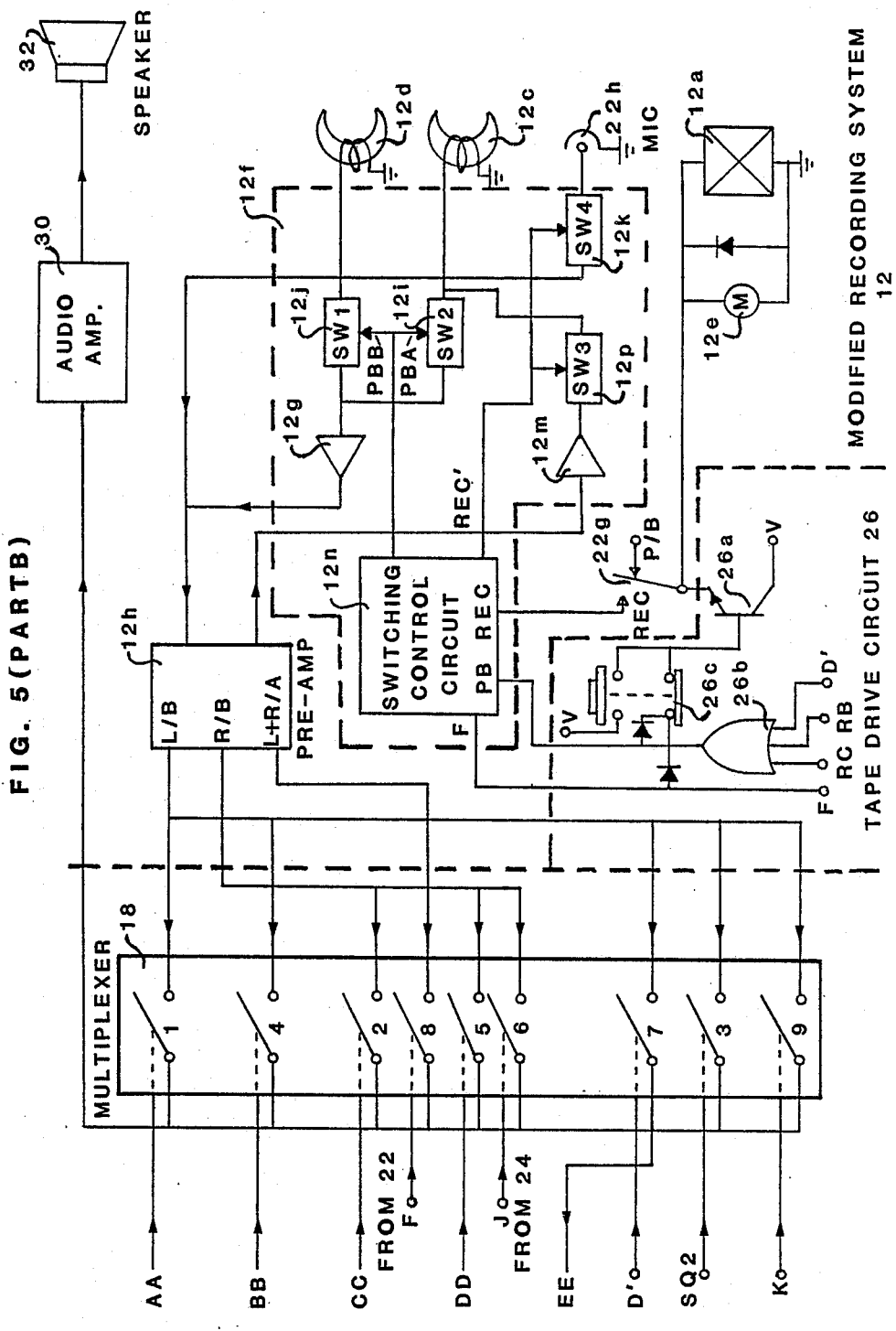
FIG. 5 (PART B)

FIG. 8

SECTION A
speed<35mph (preset=35)

24a output A 24d output Q

SECTION B
35mph<speed<40mph (preset=35mph)

24d output Q 24a output A output J output D'    motor turns 24a input R

SECTION C
35mph<speed<40mph (preset=40mph)

24d output Q 24a output A 24h output B 24k output Q

SECTION D
40mph<speed<60mph (preset=40mph)

24d output Q 24a output A 24h output Q 24k output Q output D'    motor turns

RECORDED VOICE WARNING SYSTEM FOR PROVIDING SAFETY ALERTS AND PERSONAL MESSAGES

TECHNICAL FIELD

The invention pertains to the general field of vehicle safety and fault alerts and more particularly to an electronics system that automatically activates a tape recorder programmed to provide an audible speech message of a specific vehicle fault or a time-dependent personal message.

BACKGROUND ART

The use of automatic safety alert messages to warn the driver of an automobile of an impending problem are currently in use in many automobiles. The message alert is usually in the form of a light, an audible sound such as a buzzer and/or a human voice. These devices are generally designed to alert the driver of a fault such as low oil pressure, that one or more doors of an automobile are ajar, excessive speed and other similar problems. The lights and buzzer have recently been replaced or augmented with a voice alert that is produced by either a tape recorder or a digital voice synthesizer.

Problems and equipment down-time have arisen with many of the current systems because of their electronics complexity and difficulty in maintenance. Other problems with current systems employing voice synthesized devices is that the word clarity, in many cases, is poor and they are limited in word length. Therefore, pauses between alert statement, which are necessary for message clarity, are sacrificed to achieve word length. These pauses are especially important when the radio is on and the warning messages must be heard above the radio program audio.

Three items missing from current systems include: a siren detector circuit, a speed indicator circuit and a timed personal message circuit. The siren detector circuit provides an alert signal when a fire or police siren is near by. This alert is especially critical when the radio is on and the windows are closed; under these conditions, it is very difficult for the db level of the siren to overcome the db level of the ambient noise environment inside the automobile. The speed indicator circuit is used to alert the driver when a preselected speed has been exceeded. In the prior art, there are speed alerts available that are based on instantaneous speed. The instant invention uses average speed to avoid annoying alerts that are caused by slight instantaneous excursions that occur when the speed limit is exceeded. The timed personal message, that can be programmed to turn-on at a preselected time within a one-year period, includes messages such as meeting notice, birthdays, automobile maintenance reminders and other messages of a personal nature.

A search of the prior art did not disclose any patents that read directly on the claims of the instant invention however, the following U.S. patents were considered related:

| U.S. Pat. No. | INVENTOR | ISSUED |
| --- | --- | --- |
| 4,389,639 | Torii, et al | 21 June 1983 |
| 4,383,241 | Kojima, et al | 10 May 1983 |
| 4,373,116 | Shimizu, et al | 8 February 1983 |
| 4,314,232 | Tsunoda | 2 February 1982 |

-continued

| U.S. Pat. No. | INVENTOR | ISSUED |
| --- | --- | --- |
| 4,302,752 | Weitzler | 24 November 1981 |

The Torii et al patent discloses a voice warning device that provides the warning over the same speakers that are connected to the automobile radio or cassette player. The warning is heard even if the audio level of the radio or cassette player is at a fairly high level. Additionally, the device incorporates circuitry that allows graduating the intensity and urgency or the warnings in proportion to the importance of the problem condition giving rise to the warning.

The Kojima et al patent discloses a voice warning system for vehicles. The system is designed to provide an audible voice warning when one of a plurality of critical vehicle fault conditions is detected. The system includes circuitry that allows detected conditions to be ranked in accordance with their critically importance. Thus, if a given fault condition is detected, the generation of the voice warning may be inhibited for that specific condition, if a higher priority condition is simultaneously present.

The Shimizu patent discloses a voice trip information system that includes distance travelled, duration of trip, amount of fuel consumed and the fuel consumption rate. The initial trip data is stored in a memory circuit when the ignition switch is turned on. Thereafter, the ongoing trip data is calculated. When the driver turns-off the ignition switch to stop the engine, the final data messages are delivered to the driver in a voice form.

The Tsunoda patent discloses a voice warning system for an automobile that informs the driver of various items relating to vehicle speed and distance. The messages are prioritized by order of importance. Thus, a message that the current vehicle speed has exceeded a preset speed limit is given higher priority than a message giving the distance travelled. The system describes voice emitting circuits that use either an electronic voice synthesizer or an endless loop tape and a circuit that permits the distance travelled interval to be changed in accordance with vehicle speed.

The Weitzler patent discloses an electronic time-keeping device for issuing preselected messages at predetermined times. The device includes a computer with a memory for receiving and storing information and a processor for processing the stored information. The device records and reproduces the messages on distinguishing tracks of a tape recorder. The recorded information identifying a plurality of specific future events is placed into the computer memory by a programmer and a selector selects and prepares any of the tape tracks for operative coupling to the audio system. In response to the timed occurrence, the computer energizes a signaling element to alert an individual that activation of the audio system will produce the preselected message reminder.

DISCLOSURE OF THE INVENTION

The vehicle safety and personal message system has as its primary object to increase vehicle safety and driving pleasure by providing a series of audible speech message that correspond to a vehicle safety alert event and/or a personalized message. The safety events include, but are not limited to, such reminders as: door ajar, burglar alarm ON or OFF, speed limit exceeded and a fire/police siren detector. The personalized messages include reminders such as birthdates, anniversaries, meeting date/time, stay awake reminders (especially applicable to long-haul truckers) or any other non-personal messages such as vehicle service/maintenance reminders.

One of the novel features of the system allows the messages to be recorded in either a male or female voice and in any language, including local and ethnic jargon. This feature increases world wide utility and enhances the personal nature of the message.

The system is comprised of ten major elements, included in these elements are three especially novel circuits: a safety message circuit, a time sequencer circuit and a speed indicator circuit.

The safety message circuit includes the signal conditioning and processing circuits. The circuit determines which of the signals controlling the left door, right door and the burglar alarm will be processed and prioritizes the signals and combinations.

The time sequencer circuit sets-up the timing waveforms for processing and sequencing the safety messages. The circuit establishes the duration of time the recorder motor is on; insures that messages only occur sequentially rather than simultaneously; and controls the opening and closing of the multiplexer switches. The multiplexer allows all the safety messages to be inputed and provides a single sequential message output. The message sequence is controlled by the time sequencer circuit.

The speed indicator circuit alertes the driver by a prerecorded voice message whenever the vehicle exceeds a preset speed. The message continues until the driver decreases the speed below the preset value. Four speed settings are currently available. However, additional settings may be added with minor circuit changes. The circuit includes an override control that allows the message to be turned off or suspended to a higher speed. This override feature is especially useful during maintenance and check-out periods.

Prior art patents have disclosed automatic speed control units that rely on instantaneous speed to determine and alert the driver when a preset speed has been exceeded. The speed indicator circuit of the instant invention uses average speed to determine and alert the driver of an overspeed condition. By using average speed in lieu of instantaneous speed, annoying alerts, that occur during slight overspeed excursions, are eliminated. In addition to the primary object, it is also an object of the invention to have a system that can be easily modified or changed to provide any alert that can be detected by an appropriate sensing device. Thus, the system can be customized to suit the requirement of the end user. Because of the system mechanization, the safety alert messages must be changed at a service center. However, the personal messages can be easily changed at any time by the end user.

Another object allows the system to be installed so that maintenance, when required, can be easily accomplished.

A further object allows the system to be manufactured with discrete, MSI or LSI components. LSI technology would be employed for high production rate systems and to further increase the systems intrinsic reliability.

A still further object allows the invention to be easily adapted for use on any device that employs short concise messages such as: robotics, ATM machines, telephone answering machines, fire detection devices and many other consumer oriented products.

These and other objects and advantages of the present invention will become apparent from the subsequent detailed description of the preferred embodiment and the claims taken in conjunction with the accompanying drawings.

BRIEF DESCRIPTION OF THE DRAWINGS

FIG. 4 is a block diagram of the recorded voice warning system for providing alerts and personal messages.

FIG. 5 part A and B is a schematic diagram of the system.

FIG. 8 is a timing sequence diagram of the waveforms corresponding to the speed indicator circuit.

BEST MODE FOR CARRYING OUT THE INVENTION

Figure 1:
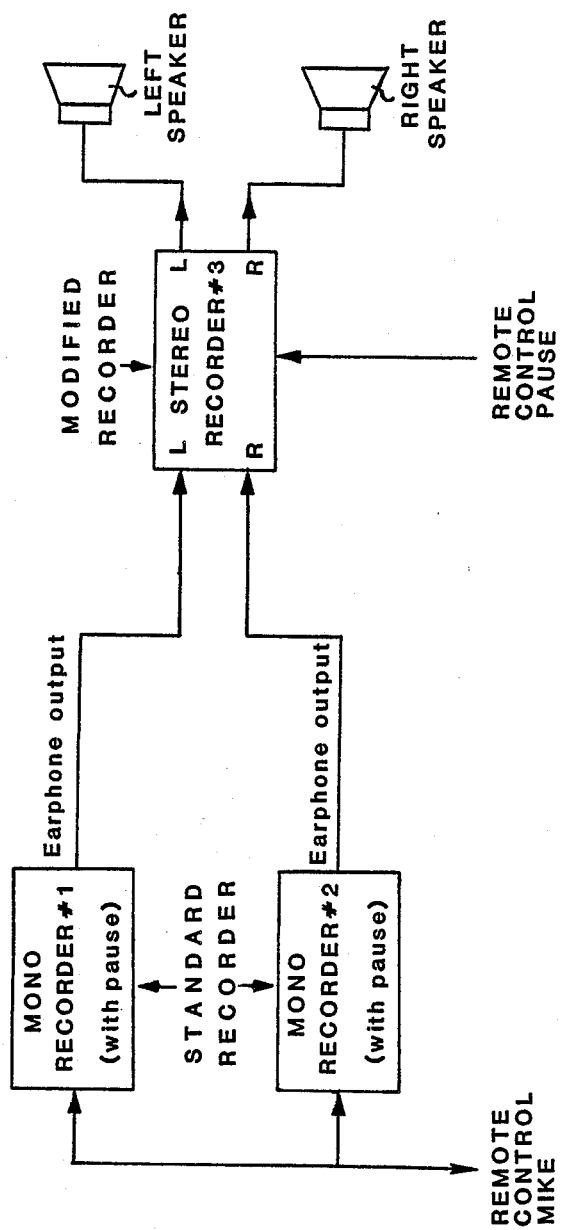
FIG. 1 is a schematic diagram showing how the tape recorders are interconnected to initially record the endless loop tape.

The best mode for carrying out the recorded voice warning system for providing safety alerts and personal messages is presented in terms of a preferred embodiment that is designed to provide an audible speech message that corresponds to either a vehicle safety alert event or a personalized message.

The system, as shown in FIGS. 1 through 11 is comprised of the following ten major elements: a set of fault detecting sensors 10, a modified tape recorder 12, and a set of electronic circuits consisting of: a safety message circuit 14, a time sequencer circuit 16, a multiplexer 18, a tape synchronizing circuit 20, a timed message circuit 22, a speed indicator circuit 24, a tape drive circuit 26 and a siren circuit 28. The ten system elements are briefly introduced below to facilitate their understanding in the detailed theory of operation that follows.

The fault detecting sensors 10 consist of various types of electronic and electro-mechanical devices. Each sensor is selected and designed to generate an electronical signal indicative of a specific fault or event.

The modified tape recorder 12 comprises all the recording and playback electronics including the audio amplifier and speaker. Two modifications are required: the manual switch used to control the recording head assembly is replaced by an electronically controlled solenoid allows the recorders dual head assembly to be positioned adjacent to the tape surface.; and the manual tape motor switch that reverses the direction of the tape motor to playback the reverse side of the tape is replaced by an electronic signal PB.

The safety message circuit 14 has the means to accept, condition and process the electrical signals from the respective sensors. The output of the circuit is a set of safety message signals that initiate the timing of the safety messages and establish the duration of time the recorder motor in the tape recorder 12 operates. The signal conditioning is well known in the art and therefore, is not shown or described in this or subsequent circuits.

The time sequencer circuit 16 has the means to accept the safety message timing signals from the safety message circuit 14 and to set-up the specific timing signal that controls the processing of the safety messages. The circuit also insures that the safety messages occur in sequential order rather than simultaneously.

The multiplexer 18 has the means to accept the safety messages from the preamplifiers in the recorder 12 and to provide a single message output. The message timing sequence is controlled by the time sequencer circuit 16.

The tape synchronization circuit 20 has the means to be activated by the signals from the safety message circuit 14. The circuit synchronizes the endless loop magnetic tape with the dual record/playback head assembly located on said recorder. The synchronization is necessary to assure that the endless loop tape starts at the same tape location and that each sequential safety message commences at the beginning of the message.

The timed message circuit 22 is used to record either a six-second single personal message or a six-second set of personalized messages on the tape. The circuit includes a timer which is programmed to alert the driver when a timed message is available. The message may be programmed to occur at any selectable time within a one-year period. The circuit also allows the personal message to be recorded by anyone in any language or ethnic jargon. Thus, adding to the personal nature of the message.

The speed indicator circuit 24 had the means to sense and provide an output signal when a preselected speed has been exceeded. The input to the circuit is provided by the over speed limit sensor and the output signal of the circuit activates the tape synchronization circuit 20 and is applied to the multiplexer 18 for further processing.

The tape drive circuit 26 has the means to be activated by the applicable sensor-signal processing circuit. The circuit provides the logic, drive and protection circuits to assure that the tape motor in the recorder 12 starts and stops the tape at the proper time.

The siren detector circuit 28 has the means to accept a signal from the siren alert sensor 10d and the means to process the signal to produce an output signal that corresponds to a preselected db level. The resultant output signal activates the tape synchronization circuit 20 and is applied to the multiplexer 18 for further processing.

The detailed theory of operation of the system is presented by first describing the following:
  pre-system tape recording set-up and head modifications,
  steps required to produce the system message tape,
  steps required to synchronize the system message tape,
  enabling signal descriptions for the taped messages,
  message enabling signals controlled by the multiplexer, and
  the sensor types and their corresponding fault detected.

Pre-system tape recording set-up and tape head modifications

Figure 2A:
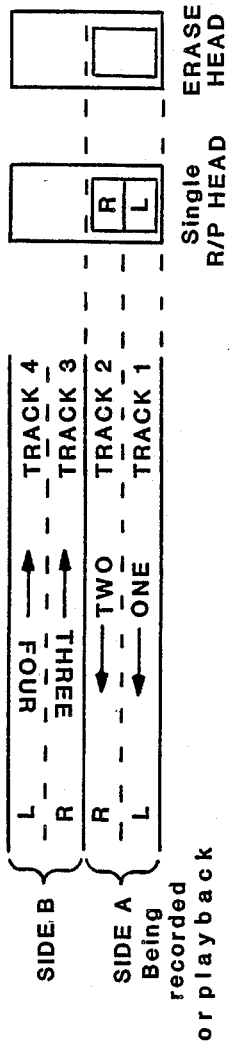
FIGS. 2A, B, C and D is an illustration showing the relationship of the tape to the recording head.
Figure 2B:
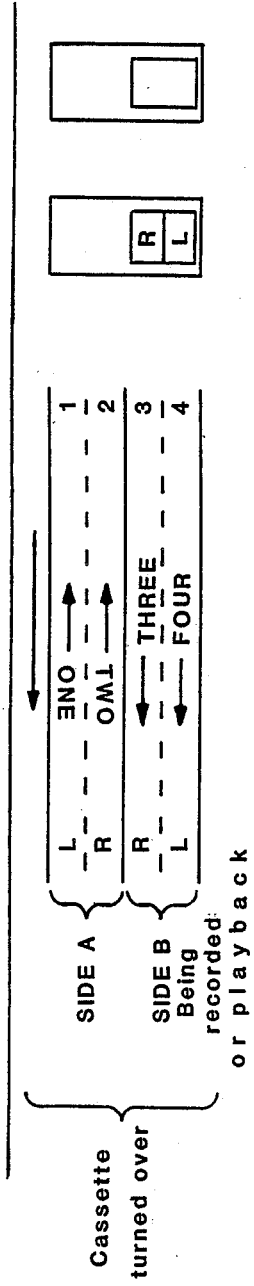

To commence the pre-system message recordings, it is necessary that two (non-system) standard mono recorders No. 1 and No. 2 be connected with a modified stereo recorder No. 3 as shown in FIG. 1. The two standard recorders No. 1 and No. 2 have a tape head configuration as shown in FIGS. 2A and 2B. The modified recorder No. 3 has a tape head configuration as shown in FIG. 2D.

To help in understanding the modification of recorder No. 3 the following discussion is first presented. The recording tape used in recorders No. 1 and No. 2, as shown in FIG. 2A, is of the type used for a stereo recording, therefore it has four separate tracks. Tracks 1 and 2 are dedicated to the Side A recording with Track 1 reserved for the left channel recording and Track 2 reserved for the right channel recording. Tracks 3 and 4 are dedicated to Side B recording right and left channels respectively.

The tape heads consist of a single record/playback (R/P) head and erase head. In the configuration shown in FIG. 2A, the erase and R/P heads make contact with Side A, as a result, information is recorded and played back on only Side A, while Side B is undisturbed. Because of the tapes direction of movement, the erase head erases Side A before the recording is made.

FIG. 2B illustrates the configuration when the cassette has been removed and turned over. Note, that Side B now makes contact with the R/P and erase heads. Since the direction of tape flow remains the same, the information recorded on Side B is in the opposite direction to the information recorded on Side A.

In FIG. 2C, the single R/P head has been rotated 180 degrees from the standard configuration as shown in FIGS. 2A and 2B. As a result, a recording can be made on Side B without having to turn the cassette over. This configuration is more evident when using an endless loop cassette (turning over the endless loop cassette would damage the tape) where recordings are only made on Side A. The reorientation of the R/P head allows a recording to be made on Side B of an endless loop cassette which cannot be altered on a standard stereo recorder because the erase head does not make contact with Side B in this endless loop configuration. In so doing the information on Side B is positively protected. The other advantage to this configuration is that the recording made on Side B is in the same direction as a recording made on Side A in a standard stereo recording machine as shown in FIG. 2A. As mentioned previously, the recording made on Side B in an endless loop cassette, as shown in FIG. 2C, is protected in a standard recorder and the recording is in the same direction as one made on Side A of a standard recorder.

FIG. 2D illustrates a configuration utilizing an endless loop cassette tape consisting of tracks A and B. In this set-up, the recording on Track B is made on a modified recorder similar to the configuration shown in FIG. 2C. The record/playback head is a dual head, whereby its lower half makes contact with Track A and can record and playback Track A; while the upper half makes contact with Track B and can only play back; the erase head only makes contact with Track A. (This recorder head arrangement is similar to a standard auto-reversible stereo recorder). Note, that with this configuration Track B is protected from being erased or recorded over when using an endless loop cassette. The "safety message" is permanently recorded on Track B unless the whole cassette is erased on an erasing machine. The Track A of this endless loop cassette is used normally which allows recordings to be made on any recorder without the possibility of altering Track B. Track A is dedicated to the "timed message."

FIG. 2D illustrates a situation in which both Track A and B can only be played back in the same direction, unlike the configuration as shown in FIGS. 2A and 2B. Track B can only be played back on a modified auto-reversible stereo recorder 12 which is described infra. The modification allows Track B to be played back in the same direction as Track A. The modified auto-reversible stereo recorder 12 is used since the head arrangement allows the playback of both Tracks A and B without having to remove the cassette. Thus, utilizing all the available tracks of an endless loop cassette tape. In standard recorders, when using an endless loop cassette, only Track A can be used, Track B can not be used since the cassette can not be turned over.

The step required to produce the system message tape follows:

STEP 1

Set-up recorders No. 1 and No. 2 in parallel with the outputs of the two recorders connected to the left and right channels respectively of recorder No. 3 as shown in FIG. 1. Recorder No. 3 is modified by rotating the single recording/playback head by 180-degrees as previously described.

STEP 2

Erase the cassettes from all three recorders before starting.

STEP 3

Connect a microphone to recorder No. 1 and record the following safety message, within six-seconds:
 "stop(PAUSE) thank you(PAUSE) left door ajar(PAUSE) right door ajar"

STEP 4

Connect a microphone to recorder No. 2 and record the following safety message, within six-seconds:
 "over speed limit(PAUSE) alarm is on(PAUSE) alarm is off"

Figure 3:
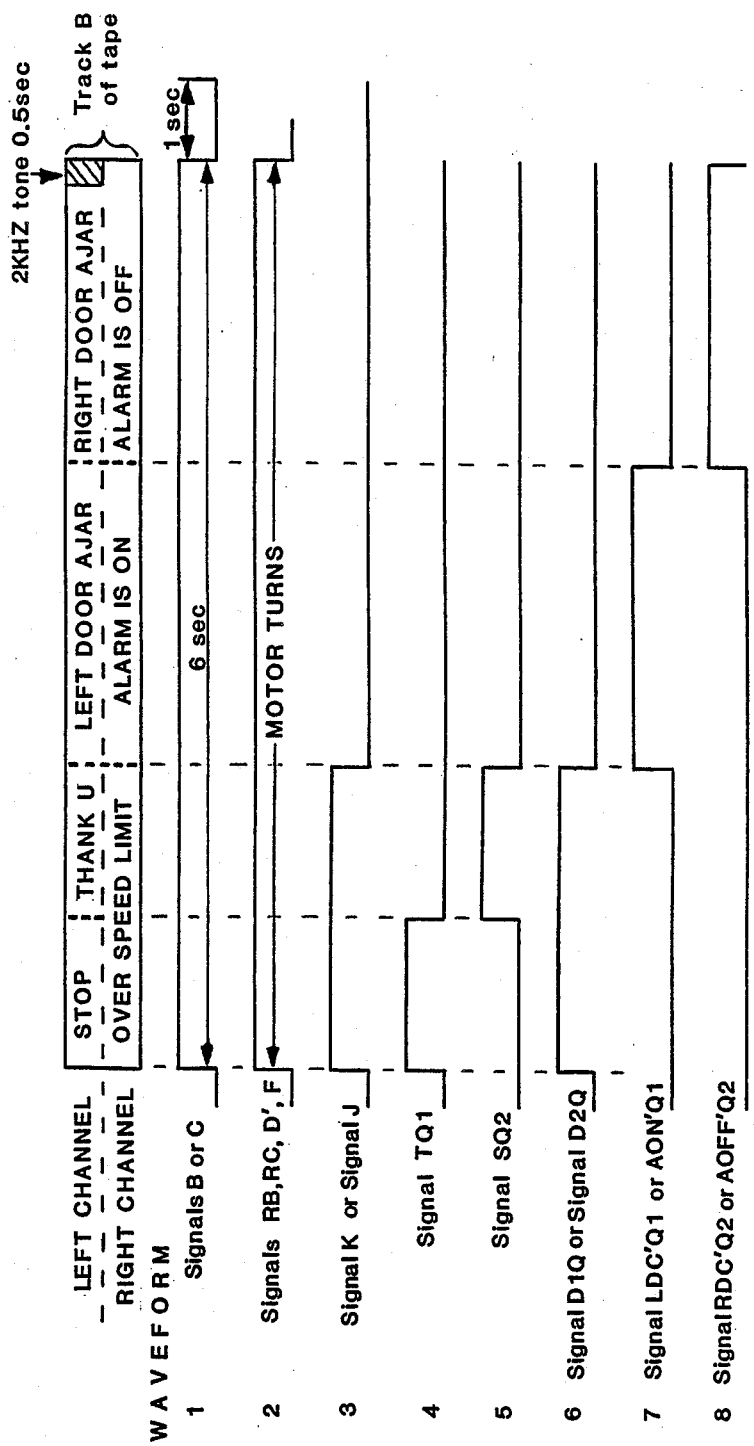
FIG. 3 is a composite diagram showing the relationship of the tape to the respective timing waveforms.

Under a normal speaking speed, the entire recording of each of the above safety message can be completed in a six-second period. The only restriction imposed on each of these recordings is that the end of the message does not wrap around to the beginning of the endless loop tape. The tape arrangement of the safety messages is shown in FIG. 3.

STEP 5

Connect the output of recorder No. 1 to the left channel of the modified recorder No. 3.

STEP 6

Connect the output of recorder No. 2 to the right channel of the modified recorder No. 3.

STEP 7

Press the pause switch and set recorder No. 3 to record.

STEP 8

Press the pause switches and set recorders No. 1 and No. 2 to playback.

STEP 9

Make certain that the start of the messages on both channels commence simultaneously. This is easily accomplished by first releasing one of the pause switches set in STEPS 7 or 8. When the messages on the released tape concludes, press the pause switch. Repeat the same process for the remaining channels. By using the common remote control, as shown in FIG. 1, start both channels to verify that both channels start simultaneously. If a simultaneous start has not occurred, briefly pause the leading tape until the start of the message on the lagging tape is synchronized. At the conclusion of the messages, from either channel 1 or 2, activate the common remote control to pause both recorders No. 1 and No. 2.

STEP 10

Press the pause switch and set up recorder No. 1 to record.

STEP 11

Connect a tone generator to the microphone input of recorder No. 1 (at this point recorder No. 2 is in the playback mode).

STEP 12

By using the common remote control of recorders No. 1 and No. 2 record a ½ second, 2 KHz tone on recorder No. 1. Care must be taken to assure that the tone does not wrap around to the beginning of the taped messages.

STEP 13

Press the pause switch and set recorder No. 1 to playback.

STEP 14

By using the common remote control, playback recorders No. 1 and No. 2 through the speaker. The tone will be the last sound heard after the completion of the messages. Stop both recorders by using the common remote control.

STEP 15

Release the pause switch on the modified recorder No. 3.

STEP 16

Activate the common remote control for recorders No. 1 and No. 2, press the pause switch of recorder No. 3 at the end of both messages after the tone is heard.

The steps required to synchronize the system message tape follows, the steps are coordinated with the timing waveforms shown in FIG. 3 in the safety messages schematic shown in FIG. 5 (Part A).

STEP 1

Place the switch 20b in the 'CHECK' position.

STEP 2

Continuously simulate a siren signal and adjust resistor R9, located in the siren detector circuit 28, until the message "stop thank you" is heard. The time period of output signal K of timer 28d is approximately 1.5 seconds, as shown in FIG. 3 waveform 3.

STEP 3

Figure 7:
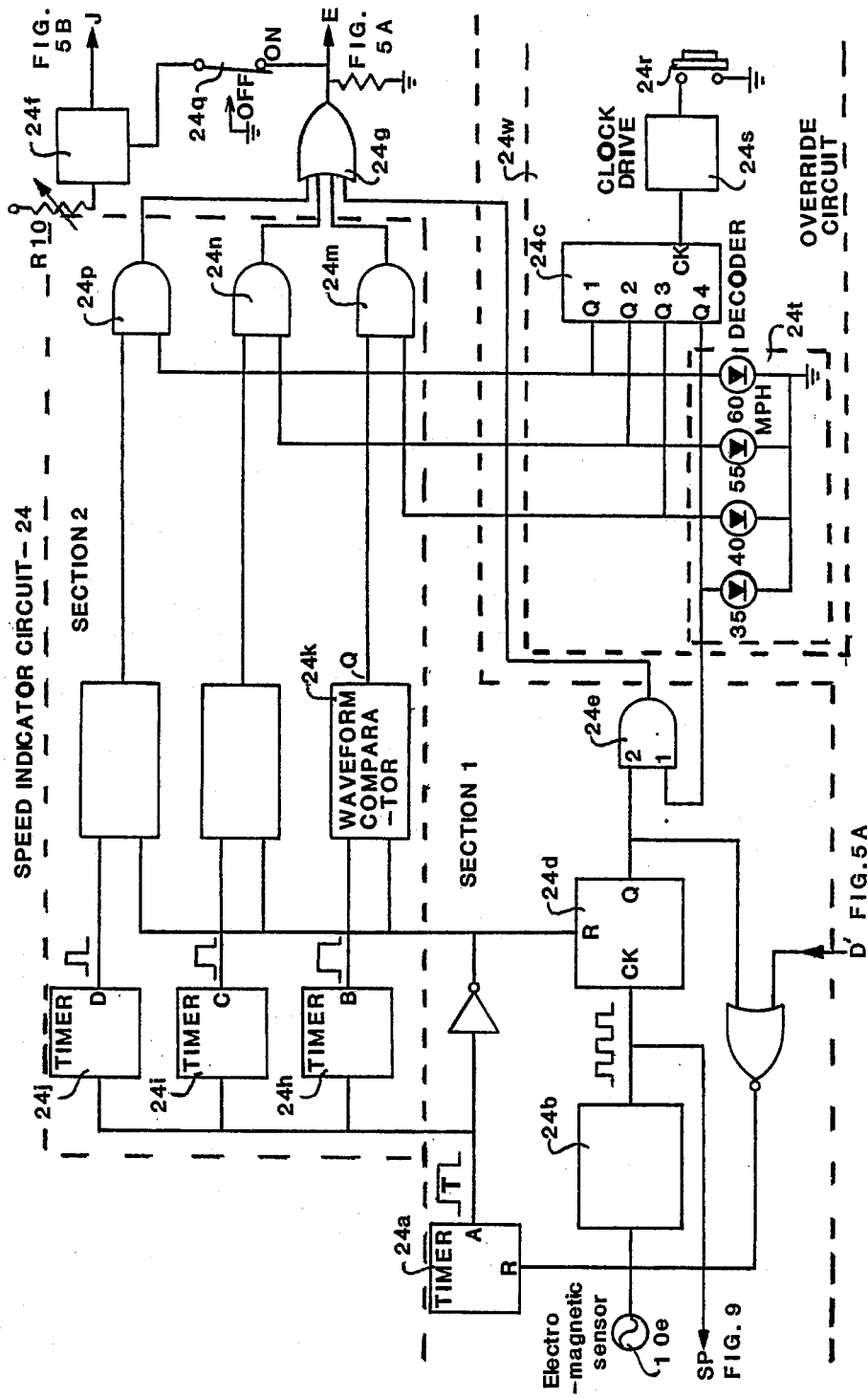
FIG. 7 is a schematic diagram of the speed indicator circuit.

Continuously simulate a speed signal and adjust resistor R10 as shown in FIG. 7, until the time period of signal J=K as shown in FIG. 3 waveform 3 of timer 24F. The message "over speed limit" will be heard over the speaker 32.

STEP 4

Repeatedly trigger timer 16f and adjust resistor R1 until the time period of output signal D1Q=K as shown in FIG. 3 waveform 6.

STEP 5

Repeatedly trigger timer 16a and adjust resistor R4 until the timer period of output signal D2Q=J as shown in FIG. 3 waveform 6.

STEP 6

Repeatedly simulate the opening of the left door and adjust the resistor R2 of timer 16g until the message "left door ajar" is heard. The time period of output pulse (LDC'Q1), of the timer 16g, as shown in FIG. 3 waveform 7 is approximately 2.3 seconds.

STEP 7

Repeatedly simulate the opening of the right door and adjust the resistor R3 of timer 16g until the message "right door ajar" is heard and not the 2KC tone. The time duration of output pulse (RDC'Q2) waveform 8 of the timer 16g, as shown in FIG. 3 waveform 8, is approximately 2.3 seconds.

STEP 8

Repeatedly simulate the alarm signal and adjust the resistor R5 of the timer 16b until the time duration of output pulse:

AON'Q1=LDC'Q1 as shown in FIG. 3 waveform 7 and adjust R6 so that:

AOFF'Q2=RDC'Q2 as shown in FIG. 3 waveform 8

STEP 9

Repeatedly pulse the check switch 20a and adjust the resistor R7 of timer 20c until the beginning of the message "thank you" is heard, then adjust R8 until the entire message "thank you" is heard. Note, R7 adjusts the time duration of signal TQ1 of FIG. 3 waveform 4 and R8 adjusts the time duration of signal SQ2 of FIG. 3 waveform 5.

The recorded tape messages used with the system as described herein are as follows:

1. Left door ajar.
2. Right door ajar. The door messages function only when the ignition switch is in the "ON" position and each message may be activated singularly or sequentially depending on whether one or both doors are ajar.
3. Burglar alarm OFF.
4. Burglar alarm ON. The "burglar alarm OFF" message functions only when the automobile ignition switch is in the OFF position. The "burglar alarm ON" message functions when the ignition switch is in either the ON or OFF position. These messages have priority over the door ajar messages. Therefore, if one of the doors remains ajar, when the ignition is on, the "left door ajar" or "right door ajar" message will be heard after the "alarm" signal is turned off.
5. Over speed limit. The over speed limit message functions only when the speed indicator "ON/OFF" switch is in the "ON" position and a preselected vehicle speed, i.e., 55 MPH is exceeded.
6. Siren alert. The siren alert signal functions when the noise level exceeds a preset db noise level i.e., the db level of an emergency vehicle siren.
7. Personalized message. The personalized message functions only when the ignition switch is in the "ON" position and the vehicle exceeds a preselected speed i.e., 20 MPH.

Note: the excessive speed alert and personalized messages are activated as a function of vehicle speed. However, because of their speed separation (20 MPH versus 55 MPH) the messages will not occur simultaneously.

The multiplexer 18 is designed to control the messages described supra. These signals together with their multiplexer switch numbers, tape location and reference waveforms enabling signal follow:

| SWITCH | TAPE LOCATION | MESSAGE | ENABLING SIGNAL | WAVEFORM FIG. 3 |
|---|---|---|---|---|
| 1 | Left Channel Track B | Left door ajar | LDC'Q1 | 7 |
| 2 | Right Channel Track B | Alarm is ON | AON'Q1 | 7 |
| 3 | Left Channel Track B | Thank you | SQ2 | 5 |
| 4 | Left Channel Track B | Right door ajar | RDC'Q2 | 8 |
| 5 | Right Channel Track B | Alarm is OFF | AOFF'Q2 | 8 |
| 6 | Right Channel Track B | Over speed limit | J | 3 |
| 7 | Left Channel Track B | Tone | D' | 2 |
| 8 | Left and Right Channel Track A | Personal message | F | — |
| 9 | Left Channel Track B | Stop-thank you | K | 3 |

The fault detecting sensors 10 consist of various types of electronic and electro-mechanical devices. Each sensor is selected and designed to generate an electronic signal indicative of the specific fault or event been processed. The signal, in turn, is applied to and processed by the applicable circuit. In the preferred embodiment, the following types of sensors are used.

| FAULT/DETECTED | REFERENCE NO. | SENSOR TYPE |
|---|---|---|
| Left/right door ajar | 10a | Electro-mechanical (switch) |
| Ignition | 10b | Electronic |
| Burglar alarm ON or OFF | 10c | Electronic |
| Siren Alert | 10d | Electro-mechanical transducer |
| Over-speed limit | 10e | Electro-magnetic |

All of the above sensors are well known in the art and therefore a detailed description is not presented.

The detailed theory of operation of the individual system circuits is described next with reference to the overall system block diagram shown in FIG. 4, the circuits schematics shown in FIG. 5, Part A and B, and the timing diagram shown in FIGS. 6 and 7.

The modified tape recorder 12, as shown in FIGS. 4 and 5B, is comprised of a standard reversible cassette recorder that requires two modifications to allow it to be adopted to the instant invention.

The first modification consists of using a dual head assembly solenoid 12a, in lieu of the conventional manual switch, to control and select either the record/playback head 12c or the playback head 12d.

Conventional tape recorders use a manual tape motor switch to reverse the direction of the recorders tape motor 12e when the other track of the tape is desired. The second modification consists of replacing this motor switch with two selectable electronic signals PB and F that turn on-the and turn-off tape motor 12e on command to allow the selected safety alert messages to be played. The PB signal through the switching control circuit 12f enables the playback mode on the Track B head (safety messages) and through the tape drive circuit 26, energises the solenoid 12a. The energized solenoid pulls-in the playback head assembly 12c, 12d and turns on the tape motor 12e. The tape recorder is then able to play back the Track B safety messages. The Track A (timed messages) of the tape is activated by the F signal and functions in a similar manner as previously described.

The playback heads 12c, 12d that retrieve the information from the cassette tape, are selected by the record and playback switching control circuit 12f which is controlled by the input signals F, PB and REC. The F signal controls the playback for the timed messages, the PB is the safety playback signal and the REC signal functions as the record signal for the timed messages.

In conventional playback systems, the selected signals from the playback heads are processed through a switch 12j, playback amplifier 12g, a preamplifier 12h, to audio amplifier 30 and through the speaker 32.

In the instant design the signal from amplifier 12g is applied to amplifier 12h and onto the multiplexer 18. The multiplexer electronically selects the desired message segment from the tape and sends that message through the audio amplifier 30 and speaker 32.

The record and playback switching control circuit 12f determines one of the following modes:
Playback Track A (timed personal messages)
Playback Track B (prerecorded safety messages)
Record Track A The above modes are selected by the three input signals F, PB and REC respectively.

The F signal, which is generated by the timed message circuit 22, is used to simultaneously energize the dual head assembly solenoid 12a and start the tape motor 12e.

The PB signal, which is a composite of the signals RB (door ajar), RC (alarm) and D' (tape synchronizing). The RB and RC signal are derived from the safety message control circuit 14 and D' from the tape synchronization circuit 20. The PB signal is also used to energize the dual head assembly solenoid 12a and start the tape motor 12e.

The REC signal is derived from the F signal when the PB-REC switch 22g is placed in the REC (record) position. The signal is used to record the timed message on Track A of the tape.

The output of the switching control circuit 12n located in the record and playback switching control circuit 12f outputs three signals: PBA (playback Track A), PBB (playback Track B) and REC' (record).

The PBA signal is outputted when the signal REC is in its low state (recorder OFF) and the signal F is in its high state switch 22g is in the P/B position. The PBA signal closes the playback Track A switch 12i to enable tne Track A recorded information to playback through the P/B amplifiers 12g and 12h.

The PBB signal is outputted when the signal REC is in its low state and the signal PB is in its high state. Under this condition, the PBB signal closes the playback Track B switch 12j and enables the tape Track B recorded information to playback as above.

The REC' signal is outputted when th P/B-REC switch 22g is in the REC position and the signal F is in its high state and the signal PB is in its low state. Under these conditions, the REC' signal is in its high state which causes the record switch 12k to enable the MIC (microphone) 22h and close the REC switch 12p. This circuit configuration allows the verbal messages (from pre-amplifier 12h) to be processed through the REC amplifier 12m, REC switch 12p and on to the Track A record head 12c allowing the messages to be recorded on Track A of the tape.

To begin operation of the system, the beginning of the recorded tracks must be synchronized with the playback head assembly consisting of playback head B 12d and record/playback head A 12c. To accomplish this synchronization, the switch 20b, as best shown in FIG. 5 (Part A) is placed in the check position and the check switch 20a is depressed to turn on the dual timer 20c which, in turn, enables latch 20d. The enabled latch 20d changes signal D' from its low state to its high state to turn on the tape motor 12e. The D' signal is mechanized to latch and remain high until the 2KC tone from the "left channel Track B" via switch No. 7 of the multiplexer 18 is detected. After the tone is detected by the tone detector 20e, the output of the detector goes high which disables the latch 20d. The output of the latch 20d, signal D' goes to its low state and turns OFF the tape motor 12e.

The above synchronizing step is mechanically performed when the system is initially assembled and installed in the vehicle. Thereafter, message synchronization is performed automatically after all messages with the exception of the timed messages. However, to ascertain that the tape and the head assembly are synchronized, the check circuit switch 20b is placed in the check position and the check switch 20a may be depressed at any time. The system acknowledges synchronization by the receipt of the the audio message "thank you". After the message is received, the check circuit switch 20b is returned to the OFF (normal) position.

The receipt of the "thank you" message also signifies that the multiplexer 18, the tape drive circuit 26, the audio amplifier 28 and speaker 32 are operating properly.

The tape synchronization circuit 20 also functions to control the tape motor 12e to process the siren alert signal SA derived from the siren transducer 10d. The transducer is optimally mounted at some internal location preferably in the rear section of the vehicle. When the db range detected by the transducer reaches a predetermined db level, i.e., the db level for a police or ambulance siren, the active bandpass filter 28a passes the SA signal to a comparator 28c. The comparator sensitivity is set by adjusting the variable resistor 28b. Thus, only the sounds that are over a selected db threshold level are processed by the comparator.

From the comparator 28c, the resulting signal is applied to a timer 28d which outputs a signal to the latch 20d. From the latch, the signal and its flow path is identical to that as previously described in the tape synchronization section.

The siren alert signal was included in the system because of the difficulty that can be experienced in hearing a siren when the vehicle's windows are closed and/or the music system is being playing loudly.

Tests have shown that most sirens near an automobile have a 140 db level above the hearing threshold. The soundproofing in most automobiles attenuates outside noise by about 20 db. Therefore, inside the automobile, the driver will hear 140 db−20 db=120 db. If the siren was one block away, the sound level would be attenuated about 45 db. Thus, in a worst-case situation, the driver hears 120 db−45 db=75 db which is about the level of loud music.

To complicate matters, the internal noise in an automobile is approximately 64 db. If this level is added to the music level of 75 db we have a typical internal noise pollution of 64 db+75 db=129 db which easily exceeds the 120 db level of the siren as heard inside the automobile. Thus, the driver is prevented from hearing the siren with its potentially dangerous consequences i.e., ambulance and fire engine accidents/delays and railroad crossing hazzards.

The safety message circuit 14 and the time sequencer circuit 16 which are described next, receive the following signals referred to in the text:

IGN—vehicle ignition
LD—left door
RD—right door
ALARM
DOOR
DOOR' (delayed)

Figure 6:
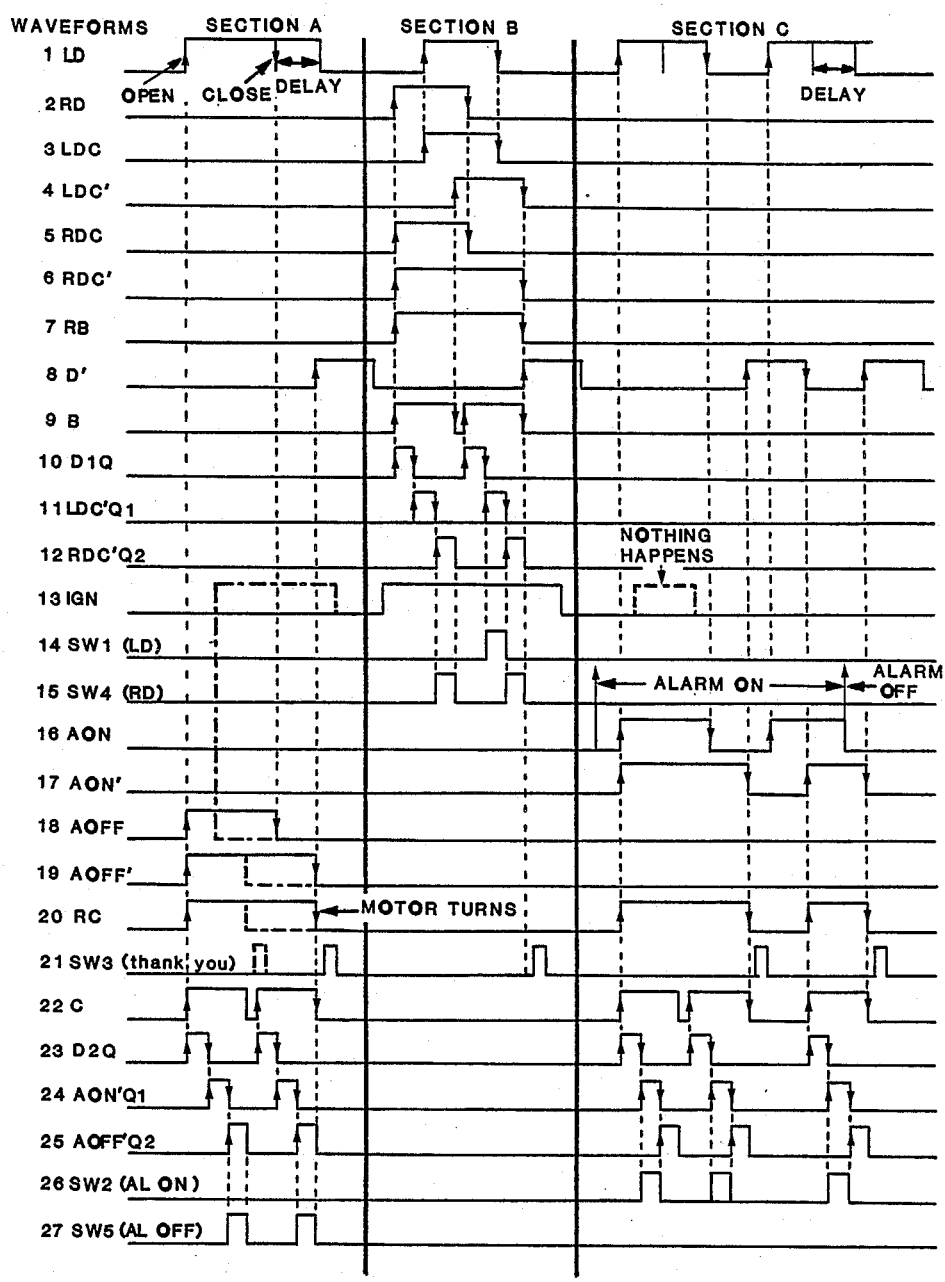
FIG. 6 is a timing sequence diagram of the waveforms corresponding to the system.

The safety message circuit is shown in FIGS. 4, 5A and 5B and the applicable waveforms are shown in FIG. 6. The description is presented in terms of the individual events controlled by the circuit.

If the vehicle ignition switch and alarm is OFF and the driver opens and closes the left door, the following events occur as references in Section A of the waveform diagram FIG. 6. When the left door is opened and gate 14f is enabled, the signal "AOFF" goes from a low to a high state. Since signals "B", "C" and "D'" are low at the start up, the latch 14d is disabled, thus the signal "AOFF'" goes from a low to a high state through OR gate 14g to change the motor driving signal RC from its low to high state. The RC signal then releases the reset condition from the astable multivibrator timer 14h. The RC signal latches 14a to prevent any changes in the input signal from registering and also turns on the tape motor 12e and solenoid 12a.

When the timer 14h is turned-on, the signal C goes from a low to a high state. When this occurs, the following three events follow simultaneously:
 the monostable multivibrator 16a is triggered to produce output pulse D2Q,
 the dual monostable multivibrator 16b is triggered to produce output pulses AON'A1 and AOFF'Q2, and
 the latch circuit 14d latches the output signal AOFF' in its high state and AON' in its low state. These signals remain latched while the C signal is in a high state.

While latch 14d is latched, the signal AOFF' remains high, thus pulse AOFF'Q1 enables AND gate 16e to close switch 5 of the multiplexer 18 for a period of time equivalent to pulse AOFF'Q2. The closure of switch 5 allows the message "alarm is off" to be heard once. The "alarm is off" is heard twice if the "C" signal starts its second cycle before the left door is closed as shown in Section A waveform 1 and 22 of FIG. 6.

When the left door is closed, the signal AOFF goes to a low state. "AOFF'" does not respond until the C signal completes its second cycle and goes to its low state. The high state of the C signal keep the latch 14d latched, which keeps "AOFF'" in its high state. When C goes to its low state, the latch 14d is released, allowing "AOFF'" to go low through OR gate 14g. The enabled OR gate drives the signal "RC" to its low state which, in turn, resets the multivibrator 14h.

The high to low transition of the signal RC triggers the dual monostable multivibrator 20c. The multivibrator 20c produces two pulses TQ1 and SQ2. TQ1 latches the latch 20d which then causes the signal D' to go high and turn on the tape drive motor 12e and solenoid 12a. As described supra, in the tone tape synchronizing circuit 20, the D' signal remains high and is latched until a tone is received from the left channel Track B of the endless loop tape.

The signal SQ2 from the multivibrator 20c closes switch No. 3 of the multiplexer 18 and the message "thank you" is heard through the speaker indicating that the left door is secured.

As also previously mentioned, the high state of the "C" signal latches the latch 14d, thereafter, any changes in the input signals applied to AND gate 14e and 14f are not registered. This logic prevents the alarm message in progress from being truncated due to a change in the alarm or ignition input signals i.e., an 'OFF' to a 'ON' condition. Additionally, the high state of the RC signal latches 14a and any changes in the input signals applied to the latch 14a are not registered. Thus, if the ignition switch were to be turned on while the left door was still opened, the RC signal would have maintained the latch 14a in a latched condition until the C signal completed one cycle, as discussed below. This logic prevents the alarm messages from being truncated by the door messages because of a change in status of the ignition switch. Also, note that the AON' and AOFF' signals applied to AND gates 16c and 16e are latched.

Since the signals AON' and AOFF' are not affected by changes in the input condition, they are used to prevent message truncation by controlling the AND gates 16c and 16e. The signal AON' or AOFF' remain in its high state while the pulse AON'Q1 or AOFF'Q2 is received respectively. Under this condition, the multiplexer 18 switch No. 2 or 5 remain closed throughout the duration of the pulse, thus preventing message truncation.

When the ignition switch is turned ON, while the left door is open, the signal AOFF, applied through NOR gate 14j goes low, disabling AND gate 14f and causing the signal AOFF' to go low after the first cycle of the signal C. Thus, the message "ALARM IS OFF" is heard only once. When RC goes to a low transition, the message "THANK YOU" is heard as referenced in the dotted waveforms 13, 18, 19, 20, 21 of FIG. 6.

In the following discussion, the waveforms applicable to the discussion are shown in Section B of waveform diagram FIG. 6.

The signals RD, RDC, RDC', RB, B and D1Q go high to trigger the message "RIGHT DOOR AJAR". Note that the priority of the signals have changed, it is more important to know that the door is ajar while the ignition is on rather than that the "ALARM IS OFF".

If the ignition is ON and the right door is opened, AND gate 14c is enabled to produce the signal RDC which allows the signal RDC' from the latch 14d to go from a low to a high state. RDC' goes through OR gate 14k to make the signal RB high. The RB signal releases the reset condition from the astable multivibrator 14i to take signal B high and also turns on the tape motor 12e and the solenoid 12a. The low to high transition of signal B sequentially triggers monostable multivibrator 16f, and dual monostable multivibrator 16g located in the time sequencer circuit 16, to produce timing waveforms LDC'Q1 and RDC'Q2. Since the signal RDC' is high, the AND gate 16i is enabled to close switch No. 4 of the multiplexer 18. When the switch closes, the message "RIGHT DOOR AJAR" is heard through the speaker 32.

If the left and right doors are opened simultaneously, both door ajar messages will be heard one after the other. This sequential message occurs because after the right door is opened, the latch 14a being unlatched (signal RC low) allows the signal RDC to go to its high state. Since RDC is high, when signal B completes its first cycle to unlatch latch 14d (signal B goes low), RDC' goes to a high state. Thereafter, signals LDC' and RDC' are in the high state allowing both AND gates 16h and 16i to be enabled which in turn sequentially closes switches No. 1 and No. 4 in the multiplexer 18.

After both doors are locked the signal RB goes from a high to a low transition to trigger the tape synchronizing circuit 20 and the message "THANK YOU' via switch No. 3 of the multiplexer 18 is heard over the speaker 32.

In the following discussion, the waveforms applicable to the discussion are shown in Section C of waveform diagram FIG. 6.

When the driver exists the vehicle from the left door, while the alarm is on and the ignition is off, when the left door opens AND gate 14e is enabled and the signals AON, AON' and RC go from their low to their high state to release the reset condition from monostable multivibrator 14h, the signal C goes from its low to its high state to sequentially trigger the monostable multivibrator 16a and the monostable multivibrator 16b. The output pulse AON'Q1 then enables AND gate 16c which closes switch No. 2, on the multiplexer 18 and the message "ALARM IS ON" is heard.

When the driver exits the vehicle and closes the left door, while the alarm is on, the left door signal has a five-second delay mechanism. Therefore, nothing happens until the five-second period has expired at which time the AON signal goes to its low state. The signals AON' and RC go low after the C signal completes its second cycle. At the completion of this cycle the "ALARM IS ON" message would have been heard twice. The high to low transition of signal RC triggers the "THANK YOU" message and the signal D' turns on the tape motor 12e and the solenoid 12a.

If the driver, after exiting, immediately re-enters the vehicle, and the D' signal is still in its high state, the AON signal goes high and the signal AON' remains low until the D' signal goes low.

When the D' signal goes low, the signal AON' goes high along with signals RC and C. This logic causes the tape motor 12e to restart along with solenoid 12a to trigger the message "ALARM IS ON" via switch No. 2 of the multiplexer.

In this next condition, the driver closes the left door, with the AON signal still in its high state, due to the five-second door delay mechanism. If the driver turns off the alarm within the five-second period, the C signal will complete its cycle, and the RC signal will go from its high to its low state to trigger the D' signal. The D' signal will restart the tape motor 12e and the solenoid 12a to trigger the message "THANK YOU" via switch No. 3 of the multiplexer. The five-second door delay ensures that the gate 14e remains enabled and the AON signal remains high long enough to give the driver sufficient time to hear the message "ALARM IS ON". In the event the driver does not turn off the alarm within ten seconds, the alarm will be energized and the driver will be given a final reminder to turn off the alarm.

Note, that turning on the vehicle ignition switch, while the alarm is on does not effect the message "ALARM IS ON" since the AND gate 14e keeps AON high as described above; and the high RC signal latches the latch 14a to prevent the input signal IGN from registering, thus preventing truncation of the alarm message by the door message until the alarm safety alert is corrected.

The speed indicator circuit 24, as shown in FIGS. 4 and 7, alerts the driver when a preset vehicle speed has been exceeded by annunciating the message "over speed limit". In the best mode, four speed's have been mechanized, 35, 40, 55 and 60 miles per hour (mph). Although all speeds referred to in the text are in mph, the equivalent speed in kilometers per hour (kph) may just as easily be provided.

The circuit 24 is comprised of two sections—section 1 and section 2. Section 1 which is the main section and functions independently of section 2, processes the lowest speed, which in this case is 35 mph and supports the operation of section 2. Section 2 is designed to process the speeds above 35 mph which in the preferred embodiment are 40, 55 and 60 mph.

The speed override function of the speed indicator circuit 24 utilizes the following logic circuits: the speed indicator circuit on/off switch 24q disables the circuit 24 when placed in the "OFF" position; and the speed override circuit 24w, which suspends the speed alert, consists of the following logic circuits—an override switch 24r, a clock drive circuit 24s, a decoder circuit 24c and an LED display panel 24t.

The speed indicator circuit on/off switch 24q when placed in the "OFF" position disconnects the speed indicator circuit 24 from the tape synchronization circuit 20 and the multiplexer 18. Under these conditions, the OVER SPEED LIMIT" message is disabled, while the circuit 24 remains operational.

The speed override circuit 24w functions as follows: by momentarily pressing the override switch 24r a signal is produced that triggers the clock-circuit 24s which, in turn, clocks the decoder 24c. Clocking the decoder 24c changes the state of the output signals Q1, Q2, Q3 and Q4. At start-up the output Q4 is high and $Q_1$, $Q_2$, and $Q_3$ are low; the high form output Q4 turns on the "35 mph LED" indicating a preset speed of 35 mph and also pulls input No. 1 of the AND gate 24e high to enable the speed processing of section 1 of circuit 24.

Momentarily pressing switch 24r makes the output Q3 of decoder 24c high and Q1, Q2 and Q4 low. This condition turns on the "40 mph LED" and sets up AND gate 24m which enables the speed processing of section 2. By pressing switch 24r the high state from output Q3 is shifted to Q2 and then to Q1, enabling AND gate 24n and AND gate 24p, respectively. An additional pressing of switch 24r enables section 1 as previously described.

The override function is designed to suspend a preset speed alert by changing the present speed to a higher speed setting. Thus, the speed indicator circuit 24 is easily adaptable for setting various "OFF HIGHWAY" speeds by pulsing switch 24r and viewing the LED display panel 24t, without impairing the driving. Furthermore, if the driver exceeds the highest preset speed, the alert can only be suspended by vehicle deceleration or by placing the speed indicator switch 24q in the OFF position. If the highest preset speed is exceeded and the override switch 24r is depressed, the speed processing will shift to section 1 (35 mph) and the message will not be suspended.

As previously mentioned the ON/OFF switch 24q disables the circuit 24. This switch, if so desired, can be placed in a location which is not easily accessible during driving.

SECTION 1

To start operation astable multivibrator 24a is calibrated to have a time duration (T), during its high state, that is equal to the time required for a specific number of pulses to be received that corresponds to a specific speed.

Each speed pulse clocks a 32-bit shift register 24d. Whenever the output of timer 24a is in its high state it enables the register 24d, and whenever the output of timer 24a is in its low state the register is disabled. The time duration of the high state output T is calculated such that whenever 32-speed pulses are received, within time T, the vehicle is travelling at/or above the preset speed. T is calculated by solving the following speed calculating formula.

SPEED CALCULATION FORMULA $$T = \frac{3600 \times S.R.}{\text{rev/ml} \times S \times R_A \times N_P}$$

where:
T = time in seconds required for a specific number of pulses
3600 = constant (converts hours to seconds)
S.R. = number of bits in shift register
rev/ml = tire revolutions/mile. The revolutions depend upon tire size and vary from 774 to 970
S = vehicle speed in mph or kph
$R_A$ = final ratio of drive shaft to wheel turns (approximately = 3.5)
$N_P$ = number of pulses per turn of the drive shaft The speed indicator circuit 24 does not register at the instant the vehicle reaches its preset speed. Thus, the speed detection is based on an average rather than an instantaneous speed. For example, if the circuit is set for 35 mph and the vehicle momentarily exceeds that speed no indication will occur if the driver reduces the speed within a time (T). Thus, for the circuit to register, the vehicle speed must surpass the preset speed and remain there for a period of time greater than T.

The average speed is determined by the number of bits in the shift register 24d. For example, in the speed calculating formula when: S.R. = 32:

$$T = \frac{3600 \times 32}{774 \times 35 \times 3.5 \times 2}$$

T = 0.607 seconds
At a 35 mph preset speed, in a time period of 0.607 seconds the vehicle travels:
(35/3600 × 0.607) = 0.006 miles or 31.2 feet This means that the average speed is calculated over a distance of 31.2 feet. Thus, at a preset speed of 35 mph the distance over which the averaging occurs may be changed by changing S.R. For example, if a preset speed of 35 mph is exceeded over a distance of 1/16 of a mile, then SR must be equal to 339 bits for the "over speed limit" alert message to be heard over the speaker 32.

By utilizing an average speed rather than an instantaneous speed, annoying and unnecessary over speed alerts are prevented during momentary vehicle excursion that are above the preset speed.

SECTION 2

Section 2 is operative whenever the speed indicator circuit 24 is set at a speed of over 35 mph. Whenever, this circuit is set, regardless of the speed setting, the timers 24h, 24i and 24j are triggered. However, only the applicable speed timer and its respective AND gate 24m, 24n or 24p will be enabled and processed by the speed indicator circuit. The time durations for timers 24h, 24i and 24j are obtained by solving the speed calculating formula for vehicle speeds of 40, 55 and 60 mph respectively.

To aid in comprehending the operation of the speed indicator circuit 24 reference is made to the timing diagram shown in FIG. 8 Sections A, B, C and D.

SECTION A. The speed indicator 24c is set at 35 mph and the vehicle speed is less than 35 mph. The output signal A of the astable multivibrator 24a goes through its full period 2T; since the shift register 24d cannot receive 32 pulses within the time T at a vehicle speed of less than 35 mph, the output signal Q of the shift register stays in a low state.

SECTION B. The indicator 24c is set to 35 mph, vehicle speed is greater than 35 mph. Since T is set for 35 mph in multivibrator 24a this circuit will monitor speed above 35 mph as follows:

At speeds over 35 mph the output signal Q from register 24d changes from a low to a high state. This high state resets the timer 24a with the signal R, thus the signal A output of the timer does not complete its time duration T. As a result, the new time period $T_1$ is equivalent to the time that was required for 32 pulses to be received at the vehicle speed of greater than 35 mph.

The low to high state transition of the output signal Q of shift register 24d performs three functions:
it enables the OR gate 24g which outputs a high state to signal E. Signal E goes to the tape synchronization circuit 20 to start the tape motor 12e and solenoid 12a with signal D',
it enables the monostable multivibrator 24f to close switch No. 6 of the multiplexer 18 (reference block diagram, FIG. 4) to enable the message "over speed limit", and
resets the timer 24a.

After timer 24a is reset, it changes the state of the reset signal R applied to the shift register 24d, which goes from a low to a high state to reset the register. The output signal Q from the shift register 24d goes from a high to low state.

Although the signal Q goes low, the timer 24a is kept reset by the signal D'. This capability keeps the timer 24a reset until the tape motor 12e has stopped.

SECTION C. The speed indicator 24c is set to 40 mph, 35 mph<speed<40 mph.

Monostable multivibrator 24h is triggered by signal A from the multivibrator 24a.

The waveform comparator 24k, as shown in FIG. 7, produces a signal Q. The state of this signal makes the following determination:

If the time duration of the output signal A from multivibrator 24a is greater than the time duration of the output signal B from the multivibrator 24h, the output signal Q from the waveform comparator 24k is low—this indicates that the vehicle speed is less than 40 mph, If the time duration of the output signal A from multivibrator 24a is less than the time duration of the B signal, the output Q is high for a period of time equivalent to the time difference between the waveforms which indicates that the vehicle speed is greater than 40 mph.

This deduction is true since the faster the vehicle's speed the shorter the time duration of $T_1$ will be. Thus, when $T_1$ is less than the signal D from the multivibrator 24j the vehicle has exceeded a speed of 60 mph.

SECTION D. The speed indicator 24c is set to 40 mph, 40<speed<60. Since the time duration of the output signal A, from multivibrator 24a, is less than the time duration of the output signal B, from multivibrator 24h, the output signal Q from waveform comparator 24k goes high to enable OR gate 24g. As a result the tape motor 12e turns and the tape solenoid 12a is triggered. Signal J then closes switch No. 6 of the multiplexer 18 to hear the message "over speed limit".

Figure 9:
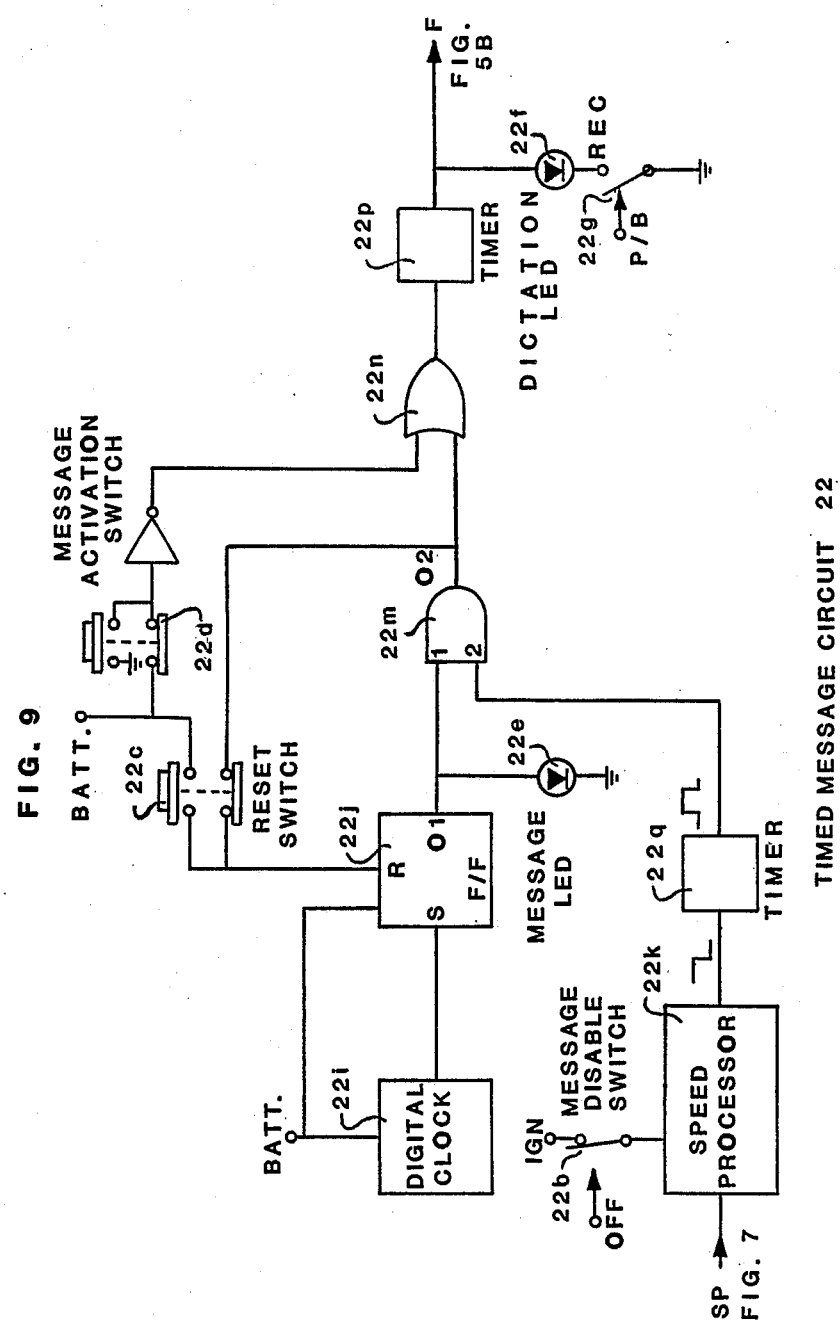
FIG. 9 is a schematic diagram of the timed message circuit.

The final description covers the personalized timed message circuit 22 which is best shown in FIG. 9. This circuit provides the vehicle driver with the capability of hearing a prerecorded, preselected six-second personal message at any time within a one-year period. One of the novel features of this circuit allows the personal message to be recorded in any language or ethnic jargon by any person. Thus, a personal touch can be added that enhances the already personal nature of the message. The only limitation imposed on the message is that it not exceed a duration of six seconds. Circuitry can also be provided to allow up to two personal messages to be recorded on one track and heard at any two selectable times within the one-year period.

Before the detailed description of the timed messages circuit is presented, the speed processor, which forms a part of the timed message circuit, is described.

The speed processor 22k, shown in FIG. 9 utilizes two sections: section one includes a timer that functions as a frequency-to-voltage converter and section two functions as a voltage comparator. The speed processor 22k detects the frequency difference between the incoming pulse train and a reference frequency which is determined by the timer. When the input frequency exceeds the reference frequency the output changes from a normally high state to a low state to trigger the speed timer 22q and produce the message as explained infra. When the input frequency falls below the reference frequency, the normally high state condition is returned but the timer 22q is not triggered. Therefore, the message is not annunciated over the speaker 32.

Figure 10:
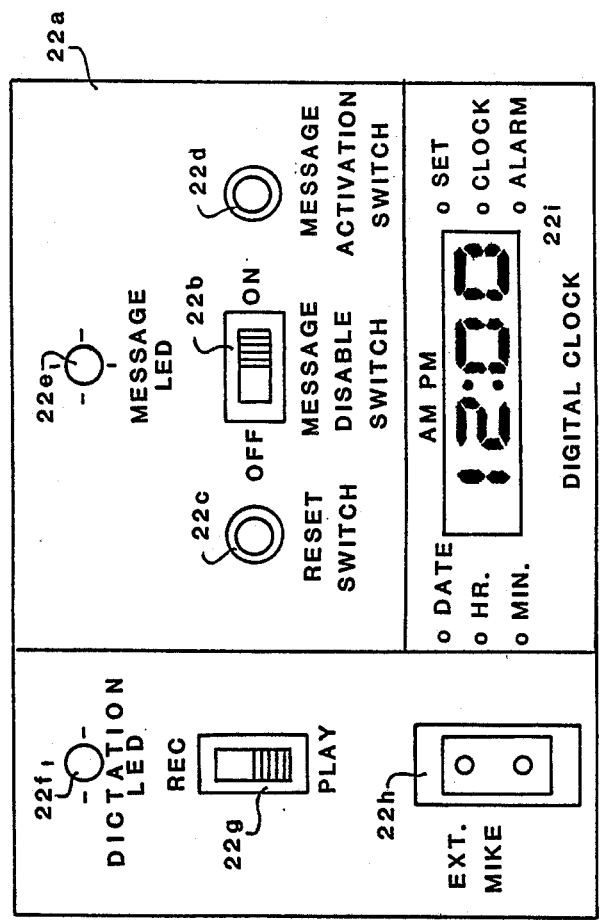
FIG. 10 is a front view of the timed message circuit front panel.

The timed message circuit is contained within a dash mounted enclosure panel 22a, as shown in FIG. 10, that houses all the circuit devices shown in FIG. 9. The enclosure front panel also has attached all the operator manipulated controls, switches and visual indicators.

In the description that follows, the panel mounted MESSAGE DISABLE ON-OFF switch 22b has been closed (set to ON) and the RESET switch 22c has been depressed to reset the output 01 from the flip-flop 22j to its low state to turn OFF the green MESSAGE LED 22e.

After the programmed time that has been set into the digital clock 22i and the time has expired, the alarm signal from the digital clock 22i goes to its high state to set the flip-flop 22j. The output 01 of the flip-flop then changes from its low state to its high state and is applied to input No. 1 of AND gate 22m and also turns on the MESSAGE LED 22e. Thus, indicating that the message time has expired and that a message is available. The AND gate 22m remains disabled until a high signal is received at input No. 2.

When the driver exceeds a speed of 20 mph, the signals from the speed processor 22k directly triggers the timer 22q to drive input No. 2 of the AND gate 22m high. The now enabled gate allows the output 02 to go from its low state to its high state; this transition causes two events to occur;

The output of OR gate 22n goes from its low to its high state and triggers the output timer 22p. The "F" signal from the enabled timer 22p goes high for the period of time that is equivalent to the time it takes for the endless loop tape to complete one rotation. The "F" signal is applied to the tape drive circuit 26 which turns on the tape motor 12e and the solenoid 12a. Simultaneously the "F" signal closes switch No. 8 of the multiplexer 18. At this occurrence, the timed message is heard through the speaker 32.

The 02 output of AND gate 22m also is applied through the closed contacts of the RESET switch 22c to reset flip-flop 22j and turn OFF the MESSAGE LED 22e.

The timed message is designed to be heard once. However, if the driver wishes to hear the message again, the message activation switch 22d may be depressed. When the switch is depressed, a signal is applied to the OR gate 22n. The enabled gate produces a high to low transition on the input of the timer 22p which causes the timed message to be turned on as previously described.

To insure that the personal timed message is heard, only at a time that does not interfere with the safety messages, the following safeguards have been "built-in" to the system 10.

Most of the safety messages are anticipated and occur between vehicle start-up and a vehicle speed of less than 20 mph. Therefore, the personal message is heard only after the 20 mph preselected speed has been attained.

If the timer on the digital clock 22i expires after the driver has exceed 20 mph, the message will not be heard until the driver either:

makes a complete stop and thereafter accelerates to 20 mph, or presses the message activation switch 22d.

To record a personalized timed message, the following steps are taken—all components referred to are located on the timed message front panel 22a as shown in FIG. 10:
 A. Insert a microphone into the EXT. MIKE connector.
 B. Place the CIRCUIT CHECK switch 20b of FIG. 5A to 'CHECK' position. Depress CHECK switch 20a and wait until message "thank you" is heard,
 C. Place REC-PLAY switch 22g to REC (record),
 D. Depress the MESSAGE ACTIVATION switch 22d,
 E. Observe that the DICTATION LED 22f has illuminated. The LED will remain illuminated for six-seconds. The message must be dictated only during this six-second period.

The following events occur when the digital clock timer 22i expires:
 A. Driver not in vehicle,
  MESSAGE LED 22e is ON indicating a message is present,
  When driver enters vehicle MESSAGE ACTIVATION switch 22d is depressed to hear message,
 B. If driver does not notice that the MESSAGE LED 22e is ON, the message would automatically be heard when vehicle attains a speed of 20 mph,
 C. Driver is in vehicle proceeding at a speed in excess of 20 mph,
  MESSAGE LED goes ON,
  If driver reduces speed below 20 mph and thereafter accelerates to a speed greater than 20 mph, the message will be heard,
  If driver comes to a complete stop, the message may be retrieved by depressing the MESSAGE ACTIVATION switch 22d or whenever vehicle moves again and attains a speed of 20 mph.

Figure 11:
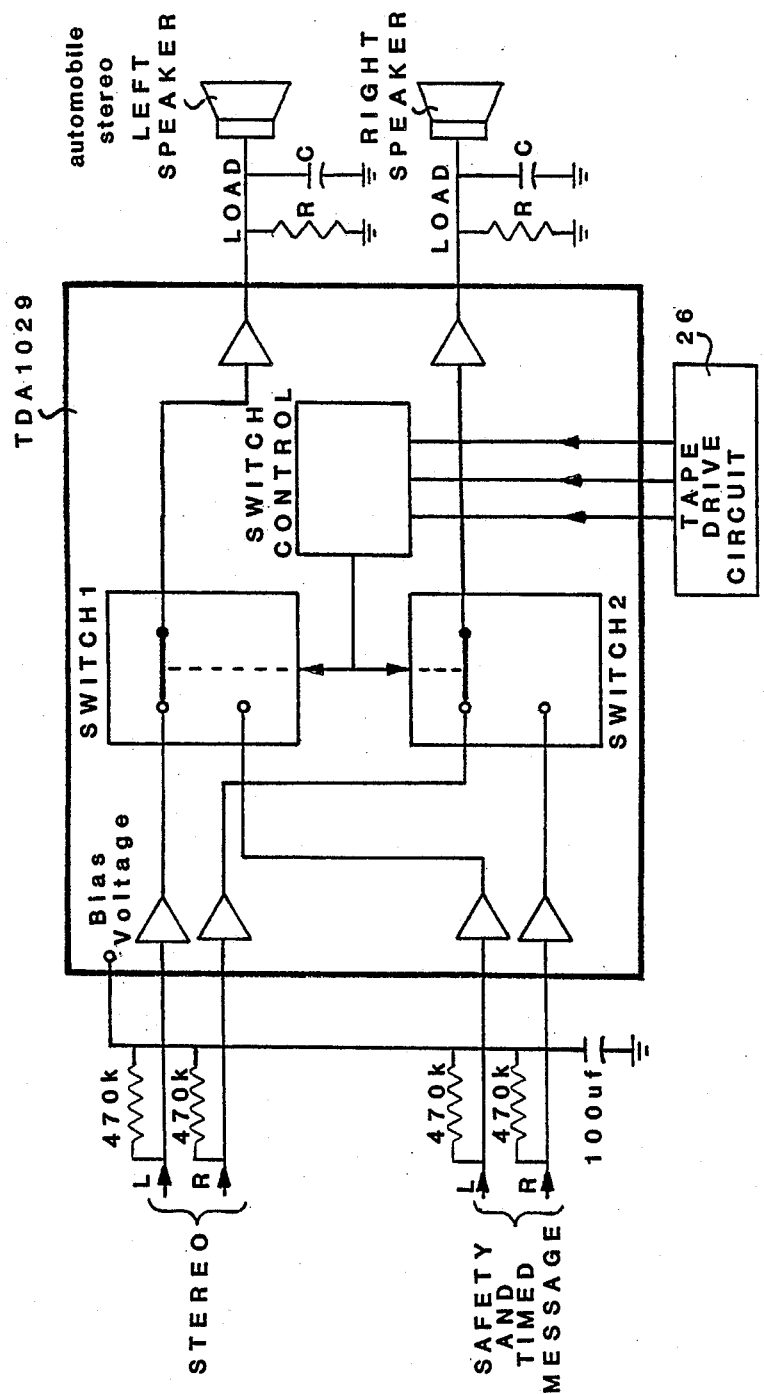
FIG. 11 is a schematic diagram of a circuit that switches the automobile stereo speaker from the radio to the system.

The safety and personal messages may be heard over a separate dedicated speaker or the automobile stereo speakers may be used. When the stereo speakers are used the safety or personal messages are switched to the speakers by means of a stereo audio switch such as a SIGNETICS TDA 1029. This switch, as shown in FIG. 11, allows the stereo audio to be switched into a protective load (470K OHM resistor in series with a 100 uf capacitor to ground) while the message audio is been heard. The load components R and C as shown in FIG. 11, are selected to allow the audio to return to its original volume slowly, thus, avoiding audio shock.

While the invention has been described in complete detail and shown in the accompanying drawings, it is not to be limited to such details, since many changes and modifications may be made to the invention without departing from the spirit and the scope thereof. Hence, it is described to cover any and all modifications and forms which may come within the language and scope of the claims.

What is claimed is:

1. A recorded voice warning system for providing safety alerts and personal messages to a device in a vehicle comprising:
 (a) a modified reversible cassette tape recorder having a dual record and playback head assembly and an endless-loop magnetic tape that incorporates a set of prerecorded safety alert messages,
 (b) a set of fault detecting sensors where each of said sensors provides an electrical signal when a change corresponding to a specific safety alert occurs and where each of said sensors is optimally located in a section of said vehicle that best provides the chanve,
 (c) a set of electronic circuits where said circuits have the means to accept and process the signals from said respective sensors and to then turn on and off said recorder playback mode at a precise time to allow the playback of a selected ssfety alert message corresponding to the specific fault detected by the respective said sensor,
 (d) means to annunciate each of said safety alert messages to the driver in said vehicle, and
 (e) a timed message circuit that allows a timed personalized message to be recorded on said recorder where said circuit comprises:
  A a digital clock that is programmed to provide an output signal at the expiration of any preselected time within a one-year period,
  B a flip-flop that is set by the output signal from said clock,
  C a two-input AND gate that is enabled when a signal from said flip-flip is received together with a signal from a speed timer that produces the second enabling signal when the drive exceeds a speed of 20 mph,
  D a two-input OR gate that is enabled by the output signal from said AND gate, and
  E an output timer that when triggered by the signal from the enabled OR gate produces an output signal
  F for a period of time that is needed by said endless loop tape to complete one revolution where said F signal simultaneously turns on said tape motor and closes the respective switch on said multiplexer to allow the personal message to be annunicated over a speaker located in said tape recorder.

2. The system as specified in claim 1 wherein a plurality of personal messages may be recorded on one track of said recorder and heard over said speaker at any selectable time within a one year period.

3. The system as specified in claim 1 wherein the output signal of said flip-flop is also used to turn-on a message indicator that when on, indicates that the message time has expired and that a message is available.

4. The system as specified in claim 1 wherein a reset switch is connected between the output of said AND gate and the reset input of said flip-flop where when said AND gate is enabled, its output signal resets said flip-flop and turns off said message indicator.

5. The system as specified in claim 1 wherein a message activation switch is connected to said OR gate such that when said OR gate is enabled said output timer is triggered to produce the output signal F.

6. The system as specified in claim 1 wherein all circuit devices, visual indicators and manually operated controls and switches are enclosed within a dash mounted enclosure.

7. A recorded voice warning system for providing safety alerts and personal messages to a driver in a vehicle comprising:
 (a) a modified reversible cassette tape recorder having a dual record and playback head assembly and an endless-loop magnetic tape that incorporates a set of prerecorded safety alert messages,
 (b) a set of fault detecting sensors where each of said sensors provides an electrical signal when a change corresponding to a specific safety alert occurs and where each of said sensors is optimally located in a section of said vehicle that best provides the changes,
 (c) a set of electronic circuits which comprises:
  A a safety message circuit having the means to accept, condition and process the electrical signals from the respective sensors and where the output of said safety message circuit is a set of safety message signals that initiate the sequencing of the safety messages and establish the duration of time the recorder motor in said tape recorder operates, B a time sequencer circuit having the means to accept the safety message signals from said safety message circuit and to set-up the safety message timing signal that control the processing of the safety messages and insure that the safety message occur in sequential order, C a multiplexer having the means to accept the safety message from said recorder and to provide a single message output, where the message timing sequence is controlled by said timer sequencer circuit, D a tape sychronization circuit having the means to be activated by the signals from said safety message circuit and to synchronize the endless loop magnetic located on said recorder so that the endless loop tape starts at the same tape location to assure that each sequential safety message commences at the beginning of the message, E a speed indicator circuit having the means to sense and provide an output signal when a preselected speed has been exceeded where the input to said circuit is provided by said over speed limit sensor and where the output signal of said circuit activates said tape synchronization circuit and is applied to said multiplexer for further processing, F a siren detector circuit having the means to accept a signal from said siren alert sensor and the means to process the signal to produce a signal that corresponds to a preselected db level where the resultant output signal activates said tape synchronization circuit and is applied to said multiplexer for further processing, G a tape drive circuit having the means to be activated by the applicable sensor signal processing circuit and the means to provide the logic, drive and protection circuits to assure that said tape motor starts and stops the magnetic tape at the proper time, H a timed message circuit that allows a timed personalized message to be recorded on said tape recorder where said circuit comprises:
  (a) a digital clock that is programmed to provide an output signal at the expiration of any preselected time within a one-year period,
  (b) a flip-flop that is set by the output signal from said clock,
  (c) a two-input AND gate that is enabled when a signal from said flip-flop is received together with a signal from a speed timer that produces the second enabling signal when the driver exceeds a speed of 20 mph,
  (d) a two-input OR gate that is enabled by the output signal from said AND gate, and
  (e) an output timer that when triggered by the signal from the enabled OR gate produces an output signal F for a period of time that is needed by said endless loop tape to complete one revolution where said F signal simultaneously turns on said tape motor and closes the respective switch on said multiplexer to allow the personal message to be annunicated over a speaker on said tape recorder, and
  (d) means to annunicate each of said safety alert messages to the driver in said vehicle.

8. A recorded voice warning system for providing safety alerts and personal messages to a driver in a vehicle comprising:
  (a) a modified reversible cassette tape recorder having a dual record and playback head assembly and an endless-loop magnetic tape that incorporates a set of prerecorded safety alert messages,
  (b) a set of fault detecting sensors where each of said sensors provides an electrical signal when a change corresponding to a specific safety alert occurs and where each of said sensors is optimally located in a section of said vehicle that best provides the changes,
  (c) a set of electronic circuits which comprises:

A a safety message circuit having the means to accept, condition and process the electrical signals from the respective sensors and where the output of said safety message circuit is a set of safety message signals that initiate the sequencing of the safety messages and establish the duration of time the recorder motor in said tape recorder operates, wherein said safety message circuit further comprises:

B a time sequencer circuit having the means to accept the safety message signals from said safety message circuit and to set-up the safety message timing signal that control the processing of the safety messages and insure that the safety message occur in sequential order, C a multiplexer having the means to accept the safety message from said recorder and to provide a single message output, where the message timing sequence is controlled by said timer sequencer circuit, D a tape sychronization circuit having the means to be activated by the signals from said safety message circuit and to synchronize the endless loop magnetic located on said recorder so that the endless loop tape starts at the same tape location to assure that each sequential safety message commences at the beginning of the message, E a speed indicator circuit having the means to sense and provide an output signal when a preselected speed has been exceeded where the input to said circuit is provided by said over speed limit sensor and where the output signal of said circuit activates said tape synchronization circuit and is applied to said multiplexer for further processing, wherein the speed indicator circuit uses a speed detection scheme that is based on an average speed thus, annoying and unnecessary over speed alerts are prevented during momentary vehicle excursions that are above the preset speed, where the speed averaging is determined by a timer and a shaft register that comprise a section of said speed indicator circuit, where said shift register is designed to accumulate a plurality of speed pulses, supplied by said over-speed limit sensor, over a time period that is determined by said timer, when the pulses are received in a time period that is less than the preset time in said timer an over-speed alert is produced that is heard over a speaker located in said tape recorder and where said speed circuit has the means to turn off the over speed alert by either disabling the speed sensor or by suspending the alert to a higher preset speed, F a siren detector circuit having the means to accept a signal from said siren alert sensor and the means to process the signal to produce a signal that corresponds to a preselected db level where the resultant output signal activates said tape synchronization circuit and is applied to said multiplexer for further processing, and G a tape drive circuit having the means to be activated by the applicable sensor signal processing circuit and the means to provide the logic, drive and protection circuits to assure that said tape motor starts and stops the magnetic tape at the proper time, and (d) means to annunicate each of said safety alert messages to the driver in said vehicle.

9. A recorded voice warning system for providing safety alerts and personal messages to a driver in a vehicle comprising:

(a) a modified reversible cassette tape recorder having a dual record and playback head assembly and an endless-loop magnetic tape that incorporates a set of prerecorded safety alert messages, (b) a set of fault detecting sensors where each of said sensors provides an electrical signal when a change corresponding to a specific safety alert occurs and where each of said sensors is optimally located in a section of said vehicle that best provides the changes, (c) a set of electronic circuits which comprises:

A a safety message circuit having the means to accept, condition and process the electrical signals from the respective sensors and where the output of said safety message circuit is a set of safety message signals that initiate the sequencing of the safety messages and establish the duration of time the recorder motor in said tape recorder operates, wherein said safety message circuit further comprises:

(1) a timer circuit that is normally in a reset condition and which has the capability to reset itself after each of said safety message faults are corrected and at the end of a six second time period which corresponds to the length of said tape, (2) a latch circuit that upon receiving a signal from one of said sensors is energized preventing other sensor signals from being processed until said timer has completed its six second time period, thus two safety messages cannot be heard simultaneously or the safety message in process cannot be truncated and where said latched circuit provides a control signal that:

(a) sets said timer circuit and controls the timing operations of said system, (b) energizes said tape motor at a precise time, and (c) in combination with the timing signal from said timer sequencer circuit controls the operation of the switches in said multiplexer to allow the selected safety alert message to be played, B a time sequencer circuit having the means to accept the safety message signals from said safety message circuit and to set-up the safety message timing signal that control the processing of the safety messages and insure that the safety message occur in sequential order, C a multiplexer having the means to accept the safety message from said recorder and to provide a single message output, where the message timing sequence is controlled by said timer sequencer circuit, D a tape sychronization circuit having the means to be activated by the signals from said safety message circuit and to synchronize the endless loop magnetic located on said recorder so that the endless loop tape starts at the same tape location to assure that each sequential safety message commences at the beginning of the message, E a speed indicator circuit having the means to sense and provide an output signal when a preselected speed has been exceeded where the input to said circuit is provided by said over speed limit sensor and where the output signal of said circuit activates said tape synchronization circuit and is applied to said multiplexer for further processing, F a siren detector circuit having the means to accept a signal from said siren alert sensor and the means to process the signal to produce a signal that corresponds to a preselected db level where the resultant output signal activates said tape synchronization circuit and is applied to said multiplexer for further processing, and G a tape drive circuit having the means to be activated by the applicable sensor signal processing circuit and the means to provide the logic, drive and protection circuits to assure that said tape motor starts and stops the magnetic tape at the proper time, and (d) means to annunicate each of said safety alert messages to the driver in said vehicle.

10. The system as specified in claim 9 wherein said safety message circuit further comprises a latch circuit and a timer circuit that function together to allow a plurality of said safety messages to be sequentially selected.

* * * * *